United States Patent [19]

Büttner et al.

[11] Patent Number: 5,176,804

[45] Date of Patent: Jan. 5, 1993

[54] PROCESS FOR THE PRODUCTION OF CATALYST PASTES CONTAINING DIBUTYLTIN OXIDE AND THE USE THEREOF

[75] Inventors: Gabriele Büttner, Ratingen; Norbert David, Heiligenhaus; Klausjörg Klein, Wuppertal, all of Fed. Rep. of Germany

[73] Assignee: Herberts Gesellschaft mit beschrankter Haftung, Wuppertal, Fed. Rep. of Germany

[21] Appl. No.: 622,539

[22] Filed: Dec. 5, 1990

[30] Foreign Application Priority Data

Dec. 9, 1989 [DE] Fed. Rep. of Germany ....... 3940781

[51] Int. Cl.⁵ .............................................. C25D 13/00
[52] U.S. Cl. ................................ 204/181.7; 502/151; 502/152
[58] Field of Search .................. 502/151, 152; 204/181.4, 181.7

[56] References Cited

U.S. PATENT DOCUMENTS

| 4,292,155 | 9/1981 | Bosso et al. | 204/181.7 |
| 4,452,681 | 6/1984 | Moriarity | 204/181.7 X |
| 4,711,917 | 12/1987 | McCollum | 204/181.7 X |
| 4,891,111 | 1/1990 | McCollum et al. | 204/181.7 |
| 4,994,507 | 2/1991 | Debroy et al. | 502/152 X |

Primary Examiner—Patrick P. Garvin
Attorney, Agent, or Firm—Schweitzer Cornman & Gross

[57] ABSTRACT

1 Process for producing a catalyst paste for cathodically separable electrophoretic dipping lacquers.

2.1 Use was made of dibutyltin oxide by way of a catalyst paste for electrophoretic dipping lacquers, dispersed in pasting binders. An object is to provide a new process for producing such catalyst pastes while saving time and energy.

2.2 A process is provided for producing a catalyst paste for cathodically separable electrophoretic dipping lacquers, wherein the dibutyltin oxide is first pre-dispersed with an organic solvent and an organic acid such as is commonly used for neutralizing cathodically separable electrophoretic dipping lacquers, whereupon it is dispersed with the pasting binder and water and ground.

2.3 Cathodic electrophoretic dip lacquering making use of catalyst pastes containing dibutyltin oxide.

7 Claims, No Drawings

PROCESS FOR THE PRODUCTION OF CATALYST PASTES CONTAINING DIBUTYLTIN OXIDE AND THE USE THEREOF

This invention relates to a process for the production of a catalyst paste for cathodically separable electrophoretic dipping lacquers based on dibutyltin oxide (DBTO).

Cathodic electrophoretic dip lacquering is a known process for lacquering electrically conductive surfaces, such as surfaces of metals, electrically conductive plastics, electrically conductive layers of lacquer etc. With this process the lacquer particles are precipitated from the electrophoretic dip lacquering bath onto the surface of the cathodically connected workpiece. These coagulated particles are then spread so as to form a homogeneous smooth film which may, thereafter, be chemically cross-linked. The spreading and cross-linking processes are frequently promoted by heating the substrate.

For many applications, e.g. in the automobil industry, it is essential for coatings to achieve an appearance which is particularly good. Hence the coating must have a uniform, homogeneous appearance on a variety of different surfaces, and it must be uniformly layered. Similarly, it is not permissible for surface faults such as dimples, pinholes or coagulates to be visible. These may be due either to the binder used or to the pigment dispersal.

Faults due to the binder, e.g. gel particles, may occur if inhomogeneities were present during resin synthesis, as such inhomogeneities give rise to different molecular and resin structures and possibly to the formation of gels. It may also happen that after synthesizing the binder, excessively high temperatures are used during further processing to produce an electrophoretic dipping lacquer coating medium. This may result in decomposition phenomena. It is also possible for cross-linking to occur prematurely. These gel particles may give rise to surface faults on the lacquer deposited. They must therefore be removed by filtration or otherwise a certain temperature range must not be exceeded when producing and processing the binders.

Pigment dispersal, i.e. dispersal of non-soluble constituents such as pigments, catalysts, etc., generally takes place in a binder, and frequently a specialised pasting binder. This pasting binder may contain either ionic groups or groups ionisable by neutralisation with an appropriate acid. The pigments are stirred into a mixture of this pasting binder with acid, solvent, optionally fully deionised water and other additives. Following adjustment to a suitable viscosity, the resultant paste is ground to the required fineness of grain. With this process, good dispersal presupposes an appropriate dwell time in the grinding unit. The grinding unit may be for example a bead mill.

Dispersal of this viscous paste results in a considerable amount of heat. The latter must be removed from the paste during grinding, by cooling since the paste may otherwise undergo irreversible changes. It may therefore be necessary to pass the paste through the grinding apparatus repeatedly in order to achieve good dispersal. This is very energy- and cost-intensive and may possibly cause the paste to be negatively affected Different pigments, this term being deemed to include also other non-soluble constituents, such as solid catalysts, have different dispersal characteristics. In this connection it has proved that dibutyltin oxide, a frequently used powdery catalyst, is particularly difficult to disperse. Although a poorly dispersed catalyst may still act as a catalyst in electrophoretic dipping baths, the film surfaces obtained are usually unacceptable. Such a surface contains pinholes or dimples and must subsequently be ground and processed prior to the application of further surface coatings.

EP-B 0 193 685 describes a DBTO paste in which the DBTO is dispersed in a pasting resin. For producing the paste the pasting binder, dibutyltin oxide and fully deionised water are mixed and this mixture is then ground in an appropriate mill. There is no indication of the grinding intensity or the number of grinding passes. This DBTO paste may be used in electrophoretic dippling lacquer coating media and separated together with the resins. In EP-A 0 251 772 a common wetting agent is still added to the mixture of pasting resin, fully deionised water and DBTO. This paste must then be ground. It is necessary to grind for a long time subject to accurate temperature regulation in order to achieve a paste readily dispersable in the coating medium.

It is an object of the present invention to provide pastes containing dibutyltin oxide catalysts, which may be produced in a simplified manner without protracted grinding and the corresponding temperature problems, while giving rise, during the cathodic electrodeposition, to impeccable coatings.

It has been found that this object may be achieved by the present process for producing a catalyst paste for cathodically separable electrophoretic dipping lacquers based on dibutyltin oxide, by grinding dibutyltin oxide with a pasting binder in the presence of water, the process being characterised in that, prior to grinding, the dibutyltin oxide is predispersed with an organic solvent and an organic acid as commonly used for neutralising cathodically separable electrophoretic dipping lacquers at a water content up to 5 wt. % in relation to the sum of dibutyltin oxide, solvent, acid and water, and then dispersed and ground together with the pasting binder and water.

Now, it has surprisingly transpired, that by pre-conditioning in part of the acid present in the electrophoretic dipping bath and a solvent, the dibutyltin oxide in powdery form may be far more easily dispersed and results in impeccable, good and smooth electrophoretic dipping lacquer coatings. At the same time, the pasting binder is considerably less subject to thermal stresses. Furthermore, there are time and energy advantages when producing the pigment pastes.

With the process according to the present invention solid, powdery dibutyltin oxide is first dispersed in an organic solvent. The grain-size distribution of the dibutyltin oxide powder may correspond to that of conventional catalyst powders for electrophoretic dip lacquering or it may be somewhat higher, since with the present process further comminution occurs. Suitable grain sizes are, for instance, smaller than 300 µm.

The solvents suitable for pre-dispersal are organic solvents, preferably such as contain OH and/or SH groups. Other functional groups, such as NH groups, may also be present. Solvents containing OH groups are preferred.

Solvents suitable for this purpose for example:
(1) have a boiling point from 50° to 300° C., preferably from 90° to 250° C., and/or
(2) have a molecular weight from 32 to 450, preferably between 32 to 300, and (3) are at least partial miscible with a pasting binder preventing the finished pigment paste from separating, and (4) are, under conditions of application, i.e. during dispersal, available in liquid form.

Examples of such solvents are aliphatic or aromatic alcohols having one or more OH groups, such as methanol, ethanol, hexanol, cyclohexanol, isobutanol, 2-ethylhexanol, $C_1$-$C_{11}$ alkyl phenols, ethyl glycol, butyl glycol, butyl diglycol, glycerine or hydroxyacetone. Also suitable are aminoalcohols, e.g. dimethylaminopropanol, dibutylaminobutanol or cyclohexylaminobutanol. Other suitable solvents are OH-containing ethers, esters or amides, e.g. ethoxyethanol, ethoxypropanol, hexoxypropanol, hexoxybutanol, hydroxyethylacetate, hydroxybutylacetate, di(hydroxypropyl)-malonic ester or hydroxypropyl-acetamide. Mixtures of these solvents are also suitable.

Also suitable are analogous compounds containing other hetero-atoms, such as aliphatic or aromatic thiols, e.g. thiophenol, thiopropanol and propane dithiol. Such solvents may be used individually or in combination, as long as they do not react with one another.

Also other non-reactive solvents may be added to the above solvents. Examples are linear or branched aliphatic or aromatic hydrocarbons, e.g. toluene, xylene, cyclohexane, n-hexane or isodecane. Use may also be made of ketones or esters, e.g. methylisopropylketone, diisobutylketone, cyclohexanone, butylacetate, acetophenone, acetoacetic ester, isopropylpropionate, t-butylacetate or 2-ethylhexyl-butyrate. In addition, certain ethers are also suitable, e.g. diisobutylether, methylisobutylether or di-t-butyl-diethylene glycol ether.

Solvents containing OH groups are preferred, ethylene and/or propyleneglycol or ethylene or propyleneglycolmonoether having a molecular weight of from 50 to 200 g/mol being particularly preferred.

It is advantageous to use such solvents as are exemplified above, which are also added to the electrophoretic dipping bath in order to modify its characteristics in conventional manner.

In the process of pre-dispersal, an organic acid is added in addition to the solvent. This is an acid such as is subsequently used in conventional manner for neutralising the cathodically separable binder in the electrophoretic dipping lacquer, into which the present dibutyltin oxide paste is to be introduced as catalyst. It may be the same acid as used subsequently for the binder or it may be a different acid.

The organic acids are the conventional acids used for neutralising electrophoretic dipping lacquers. They are preferably monobasic acids, e.g. formic acid, acetic acid, lactic acid, dibutyl-phosphoric acid, as well as octanoic acid.

The proportion of the acid used for pre-dispersal is, e.g., in the region of from 0.05 to 5 mol acid per mol of the DBTO used.

The acid is added in substantially anhydrous manner. This means that the water content of the entire mixture of acid, solvent, DBTO, water and optionally wetting agent which is to be predispersed amounts to no more than 5 wt. %, preferably not more than 2 wt. %. The lower limit is preferably about 0.5 wt. %.

In general, it is advantageous for the acid to be soluble in the solvent used and to be present in the latter in its dissolved state, but this is not essential.

If required, additives such as anti-foaming agent or wetting agent, e.g. 2,4,7,9-tetramethyl-5-decin-4,7-diol, may be added to the mixture which is to be pre-dispersed. In general, the total quantity of such additives and in particular the wetting agent amounts to up to 3 wt. % based on the total mixture.

When pre-dispersing the DBTO in the solvent or solvent mixture, the acid and possibly a wetting agent, the amount of solvent is selected in such a way as to achieve an appropriate viscosity, i.e. so as to produce a liquid mass of low viscosity suitable for stirring in an agitating device such as a quick-acting stirrer (dissolver). On the other hand, the viscosity of the mass should not be so low that the dispersed particles easily settle again. In order to achieve an advantageous viscosity, the ratio by weight between DBTO and solvent may be varied from 4:1 to 1:4. If the mixture is too thin, the amount of DBTO may be increased in order to achieve good stability. If the viscosity is too high, solvent may be added in order to ensure adequate dispersal.

Pre-dispersal is effected by means of a stirring device such as a quick-acting stirrer (e.g. a dissolver).

The dispersal time and temperature depend on various factors such as viscosity, the types of acid and solvent and the type of stirring device.

In general, stirring times from 0.5 to 5 hours, preferably from 1 to 3 hours, are adequate. The temperature is controlled in such a way as to prevent heating above the boiling point of the solvent used and in general heating above 110° C. This may be achieved by appropriate cooling or warming. In principle, it is possible to work at any temperature below the boiling point of the solvent, although, with a view to achieving advantageous dispersal times, at least slightly elevated temperatures of, e.g., 40° C. or above are advantageous. Preferred is the range from 50° to 80° C.

Following pre-dispersal, the resultant dispersion is further dispersed and ground, after addition of pasting binder and water.

It is advantageous for the pasting binder and water to be added to the dispersion directly after pre-dispersal and without any protracted waiting period. The pasting binder may for instance, be added first and the water second, or a mixture of pasting binder and water may be added.

The pasting binder is added at a viscosity at which it is pumpable. To this end, it may be mixed with solvent. Both solvents as commonly used for electrophoretic dipping lacquers and for pre-dispersal are suitable for use as solvents.

The pasting binders suitable for preparing the DBTO paste are binders such as are commonly used for this purpose. They are known as paste resins. However, they may also be binders such as are used in electrophoretic dipping lacquers in order to form coatings and are for instance referred to below as binders for electrophoretic dipping lacquer coating media. In general they are characterised by good water solubility and also good wetting capacity. Examples of such paste binders are described, e.g., in EP-A 0 183 025 or EP-A 0 270 877. They are resins which are either capable of being dispersed in water, e.g. by quaternary ammonium groups or such as may be dispersed in water after neutralisation with an acid. In the latter case, the amount of acid used for pre-dispersal is so selected as to be adequate for dispersing the resin.

The water is added in fully deionised form.

The pasting binder and the water are added to the dispersion preferably while stirring. The amount depends on the viscosity required for grinding. In general, the ratio by weight between DBTO and pasting binder (based on solids) amounts to from 1:4 to 4:1, preferably from 1:2 to 2:1. The amount of water is, in general, at least as large as the amount of binder. The upper limit depends on the required viscosity of the paste.

The homogenised mixture may then be ground in a mill, e.g. a multi-compartment mill, in conventional manner. The dwell time advantageous with this process may be determined by the expert after a few tests.

It depends on the rate of flow, the compartment size, the reduction of temperature and the amount and type of grinding bodies. This process results in a homogeneous, dull pigment paste. When stored in the required free-flowing form this paste is stable and there is no sediment after a protracted period of time.

By possibly adding further pasting binder, further neutralising agent, further wetting agent, more water and additional pigments to the thus-produced catalyst paste, thus produced it is possible to create a coloured pigment paste. The latter may then be ground to the required fineness of grain in an appropriate grinding unit, such as a bead mill. From the resultant pigment paste, it is then possible to produce an electrophoretic dipping lacquer coating medium, as a two-component material together with a dispersion of the binders or as a one-component material mixed with the required lacquer binder, followed by dilution with fully deionised water. This electrophoretic dipping lacquer coating medium may then be used to coat conductive substrates and thereafter to cross-link the lacquer film according to conventional processes. Of course, it is possible not to use pigments. In this case, clear electrodeposition coatings are obtained.

The pigments suitable for addition to pigments pastes are, e.g., commercially available pigments. Use may be made, e.g., of titanium dioxide, carbon black, organic coloured pigments, interference pigments, aluminium silicate, barium sulphate, lead chromate, lead carbonate or phyllosilicates.

Another possibility involves adding a catalyst paste produced according to the present invention, subsequently and without further additional grinding, to an electrophoretic dipping lacquer coating material. In this case too, it is possible to achieve a smooth, fault-free surface on the stoved cathodically dip-lacquered film as deposited.

The binders or binding mixtures used with the electrophoretic dipping lacquer medium are the conventional basic film-forming resins or resin mixtures or cross-linking agents. Examples of suitable resins are, for instance, described in EP-A 0 261 385. They are resins which may be produced by radical polymerisation of monomers containing olefinic groups. They may, if required, contain OH, SH or amino groups or other functional groups. Examples of N-contains unsaturated monomers are N-dialkyl or N-monoalkyl-aminoalkyl(-meth)-acrylate, N-dialkyl- or N-monoalkyl-aminoalkyl-(meth)acrylamide and/or heterocyclic compounds having one or more basic nitrogen atoms containing vinyl groups, such as N-vinyl-imidazol.

Polymerisable monomers containing OH groups are, for instance, hydroxyalkyl(meth)acrylate or acrylamide. Other polymerisable compounds are, for instance, allyl alcohol, monovinyl ethers of poly-alcohols, vinyl aromatics, (meth)acrylic ester, (meth)acrylonitryl and vinyl ethers of monoalcohols. These compounds maybe processed to polymers in known manner by solution or emulsion polymerisation.

The binders used according to the present invention may contain ionic substituents or substituents capable of being converted to ionic groups. Examples thereof are primary, secondary or tertiary amino-groups, quaternary ammonium substituents as well as tertiary sulphur substituents. If the binders do not contain ionic or ionisable groups, they are not themselves water-dispersable binders and may only be used in conjunction with other water-dispersable binders.

Appropriate functional groups may be directly introduced into the binders via the monomers, but it is also possible for substituents with the necessary characteristics to be introduced by reactions after polymerisation. Similarly, groups capable of cross-linking, e.g. semi-blocked isocyanates, may be introduced in this manner.

The solubility of the binders may be influenced by the number of amino or OH functions. Similarly, at least two reactive groups, e.g. reactive OH groups, reactive amino-groups, reactive SH groups or blocked isocyanates, are necessary for good cross-linking in the film. The number should be controlled through the amount of corresponding monomers during the reaction. The binders preferably have a molecular weight of from 1500 to 30000, preferably from 2500 to 20000.

Other suitable binders have been described, e.g., in EP-A 0 082 291, DE-OS 36 15 810 or EP-A 0 234 395. They are basic base resins, the amine values of which may be from 20 to 250 and the number average molecular weight may be from 300 to 10000. The following groups occur by way of basic groups: $-NH_2$, $-NRH$, $-NR_2$, $-NR_3$, $-SR_2$, $-PR_3$. Nitrogen-basic groups are preferred. Base resins are, for instance, amino-epoxy resins, which are produced with the aid of known primary, secondary or tertiary amines. The chemical structure of the amino-epoxy resins and the characteristics thereof may be influenced to a great extent. The characteristics may be influenced in desired manner by appropriate selection of the epoxy resins and the amines used, by changing the amount and the functional OH groups, by varying the molecular weight and by modifying the ratio between soft or hard molecular segments. Base resins are, e.g. amino-epoxy resins with primary or secondary OH groups, amino-polyurethane resins and Mannich bases based on bisphenol A, reactive amine and formaldehyde, amino epoxy resins having terminal double bonds as well as conversion products of amines with cyclic carbonates based on dihydroxydivinyl methane (bisphenol F) or dihydroxydivinyl propane (bisphenol A).

The base resins may be self-cross-linking or such as to undergo cross-linkage when subjected to external agents. Suitable cross-linking agents are e.g. blocked polyisocyanates, melamine resins, as well as cross-linking agents capable of re-esterification and re-amidification. These cross-linking agents are well described in the literature, e.g. cross-linking agents based on triazine in DE-A 16 69 593, cross-linking agents based on masked isocyanates in "Farbe und Lack" 1989, 12th year of issue, 1983, pages 28 ff and cross-linking agents capable of re-esterification or re-amidification in EP-A 0 004 090 or DE-A 34 36 345. The cross-linking agents may be added individually or in combination. Preferred are binders or mixtures of binders containing blocked isocyanates; for instance amino-epoxy resins, where cross-linking takes place via blocked isocyanates.

These binders maybe be neutralised with the aid of the conventional acids and transferred to the aqueous phase. The organic acids used in this process are preferably monobasic acids, such as formic acid, acetic acid, lactic acid, dibutylphosphoric acid and octanoic acid. A part of this acid which may be used for neutralising the binders may be employed during predispersal with a view to producing the catalyst paste according to the invention. By using the necessary amount of acid from the electrophoretic dip lacquering bath, one ensures that no unnecessary additional acid is used when producing the DBTO paste.

It is also possible to add, in appropriate manner, additives such as plasticisers to the electrophoretic dipping bath, in order to improve the surface. By way of plasticisers use may be made of, e.g., phthalates, polyvinyl ether, or polyalkylene oxide or ethers thereof. Also low-molecular weight, non-neutralisable resins may, if required, be added in small parts in order to influence the characteristics of the film.

The electrophoretic dip lacquering coating media are one-component materials or two-component materials, i.e. the electrophoretic dipping bath is produced either from a single component by dilution, or it is produced from a mixture combining a binder dispersion and a pigment paste at a fixed ratio, this mixture being diluted. The catalyst paste is either added to the bath by means of the pigment paste or it may also be added to the electrophoretic dip lacquer at a later stage. It is quickly homogenised. The amount of catalyst paste used depends on the catalytic action on the resin binder mixture. It may easily be determined by experimentation.

The thus-produced electrophoretic dip lacquer baths make it possible to coat, in known manner, metallically-conductive substrates. The electrophoretic dipping lacquer coatings deposited are, at an elevated temperature, caused to spread and undergo cross-linkage. The thickness of the dry film amounts to from 10 to 50 $\mu$m. It is possible to apply further coatings to such films. Another method involves applying further coats to the electrophoretic dipping lacquer film wet-on-wet and to stove them only when this process has been completed. Secondary coatings may be conventional fillers, top lacquers, metallic base lacquers and/or transparent lacquers. They may be solvent-containing systems, aqueous systems or two-component systems. The resulting coatings are characterised by smooth, dense, homogeneous surfaces. They are, in particular, free from faults in the horizontal plane such a pimples, pinholes or dimples.

The following Examples illustrate the present invention.

All percentages relate to % by weight. The solids content is determined in accordance with DIN 53 182 at 150° C.,

PRODUCTION OF BINDERS

Example 1

228 parts of bisphenol A (1 mol) are reacted together with 260 parts of diethylaminopropylamine (2 mols) and 66 parts of paraformaldehyde (91%; 2 mols) in the presence of 131 parts of toluene by way of azeotropic entrainer to the point at which 42 parts of water produced by the reaction is separated. Following the addition of 152 parts of diethyleneglycoldimethylether and cooling of the product to 30° C., 608 parts (2 mols) of a toluylene-diisocyananate half blocked by means of 2-ethylhexanol are added over a period of 45 minutes. Once the NCO value amounts to virtually zero. 1400 parts of the solution are mixed with a solution of 389 parts of diethyleneglycoldimethylether, 190 parts of an epoxy resin based on bisphenol A (epoxy-equivalent weight about 190) and 250 parts (1 mol) of a glycidyl ester of a saturated tertiary $C_9-C_{11}$ monocarboxylic acid and reacted at from 95° to 100° C. to expoxy value 0. Following addition of 40 millimols of formic acid per 100 g solid resin, the product must, in faultless manner, be diluted with water.

Example 2

According to EP-B-12 463, 391 g diethanolamine, 189 g 3-(N,N-dimethylamino)propylamine and 1147 g of an adduct consisting of 2 mols hexane diamine-1,6 and 4 mols glycidyl ester of versalic acid are added to 5273 g bisphenol A epoxy resin (epoxy equivalent weight about 475) in 3000 g ethoxypropanol. The reaction mixture is maintained at 85° to 90° C. for 4 hours with stirring and then at 120° C. for 1 hour. Thereafter, it is diluted with ethoxypropanol to a solids content of 60%.

Example 3

160 g caprolactam is added slowly, at 70° C. with stirring, to 431 g of a solution (75% in ethyl acetate) of a reaction product consisting of 3 mols toluylene diisocyanate and 1 mol trimethylolpropane. The reaction mixture is then maintained at 70° C. until the NCO content has declined to virtually zero. Then, 2-butoxyethanol (204 g) is added and the ethyl acetate is distilled off through a column to a solids content of 70%.

PRODUCTION OF PIGMENT PASTES

Example 4

30 g ethoxypropanol, 3.0 g 2,4,7,9-tetramethyl-5-decin-4,7-diol wetting agent, 3.0 g formic acid (50%) and 40 g dibutyltin oxide are mixed in a dissolver and dispersed for about 2 hours at from 50° to 60° C. Then 41 g of a pasting resin according to EP-A 0 183 025, Example 5, (80%) is added to this with stirring, followed by 73 g fully deionised water. This mixture is then ground in a suitable mill in two grinding passes to the required fineness. The result is a liquid, viscous, dull pigment paste.

Comparison Test A

The following substances are added in succession in a quick-acting stirrer and mixed: 37.5 ethoxypropanol, 3.8 g 2,4,7,9-tetramethyl-5-decin-4,7-diol wetting agent, 3.8 g formic acid (50%), 51.5 g of a binder according to EP-A 0 183 025, Example 5, (80%), 50 g dibutyltin oxide and 103.5 g fully desalinated water. This mixture is stirred until it is homogeneous and then ground in the same mill as in example 4, in two grinding passes. This results in a liquid, viscous, dull pigment paste.

Comparison Test B

The following substances are added in succession in a quick-acting stirrer and mixed: 37.5 g ethoxypropanol, 3.8 g 2,4,7,9-tetramethyl-5-decin-4,7-diol wetting agent, 3.8 g formic acid (50%), 51.5 g of a binder according to EP-A 0 183 025, Example 5, (80%), 50 g dibutyltin oxide and 103.5 g fully deionised water. This mixture is stirred until it is homogeneous and then ground to the required fineness in an appropriate mill, over 6 to 8 grinding passes.

Example 5

30 g ethoxypropanol, 3 g wetting agent, 2 g acetic acid (100%) and 40 g dibutyltin oxide are mixed in a dissolver and dispersed for 2 hours at from 50° to 60° C. Then 60 g of a pacting recin according to EP-A 0 183 025, Example 3, (55%) is stirred in, followed by 64 g fully deionised water. Following homogenisation the mixture is ground in an appropriate mill over two grinding passes to the required fineness of grain.

Example 6

75 g of a binder according to EP-A 0 183 025, Example 5, (80%) is mixed with 7 g formic acid (50%) and 250 g fully deionised water. To this transparent lacquer is added 82.5 g of a paste according to Example 4, followed by 408 g titanium dioxide, 120 g aluminium silicate and 13.5 g carbon black. This paste is adjusted to a suitable viscosity by adding about 90 g water. The solids content of this pigment paste amounts to about 60%. Then this paste is ground in a bead mill to the required fineness of grain.

Comparison Test C

The procedure is as in Example 6, but instead of 82.5 g of a paste according to example 4, 82.5 g of a paste according to Comparison test A is used. The remainder of the process is as before.

Comparison Test D

The procedure is the same as in Example 6, but, instead of paste 1 use is made of 82.5 g of a paste according to comparison test B.

Example 7

378 g binder according to Example 2, 7.5 g acetic acid (100%) and 85 g of a paste according to Example 5 are mixed. To this are added, with stirring, 6 g carbon black and 559 g titanium dioxide. To achieve an appropriate viscosity, use is made of about 500 g butyl glycol, and, with the aid of an appropriate mill, the pigment paste is ground to an adequate fineness of grain.

LACQUER EXAMPLES

Example 8

A mixture is produced from 300 g of a resin according to Example 2 and 700 g according to Example 1 (based on the solids content). This mixture is largely freed of solvents by distillation, mixed with 45 g lactic acid (50%) and converted at elevated temperature to a dispersion containing about 43% solids. 333 g of the pigment paste according to Example 6 is added to 1166 g of this dispersion after dilution with fully deionised water to about 15% solid content. The result is a cathodic dipping bath having about 20% solids. In this CED-bath, steel sheets are coated and then cross-linked by heating. The surfaces of the coated substrates (dry film thickness 20-22 μm) look smooth and even and do not exhibit film defects. (CED=cathodic electrodeposition)

Comparison Test E

The procedure is the same as in Example 8, but by way of pigment paste the same amount of a paste according to comparison test C is added. The test substance is used for coating in the same way as already described in Example 8. The surfaces look rough and exhibit surface defects.

Comparison Test F

The procedure is the same as in Example 8, but use is made of the pigment paste described in comparison test D. The test substance is used for coating in the same way as in the other cases. The resultant surface is smooth and homogeneous.

Example 9

Binders according to Example 2 and Example 3 are mixed in a ratio of 3:1 based on the solids content and blended with 3.7 g formic acid (50%) per 100 g solid substance. 719 g of the paste according to Example 7 is added to 659 g of this mixture, the mixture being intensively homogenised and adjusted having methoxypropanol to a solid content of about 55%. A CED bath with a solids content of about 17% is produced from this material by dilution with fully deionised water. This lacquer may be coated on the conventional substrates. The resultant surfaces are homogeneous, dense and free from surface defects.

We claim:

1. A process for the production of a catalyst paste for cathodically separable electrophoretic dipping lacquers based on dibutyltin oxide by grinding dibutyltin oxide with a pasting binder in the presence of deionised water, characterised in that the dibutyltin oxide is, prior to grinding, pre-dispersed with an organic solvent and an organic acid as commonly used for neutralising cathodically separable electrophoretic dipping lacquers and optionally a wetting agent, at a water content of up to 5 wt. % based on the sum of dibutyltin oxide, solvent, acid and water, as well as optionally a wetting agent, and is then dispersed and ground together with the pasting binder and the water.

2. A process according to claim 1 wherein by way of organic solvent use is made of a solvent comprising OH and/or SH groups, optionally in combination with other solvents.

3. A catalyst paste produced by a process according to claim 1 or claim 2.

4. A process for cathodic electrophoretic dip lacquering of an electrically conductive surface of an object, which comprises immersing the object into an electrophoretic dip lacquering bath containing the catalyst paste prepared by the process of claim 1.

5. The process of claim 4, wherein the electrophoretic dip lacquering bath further contains binders or mixtures of binders containing blocked isocyanates.

6. An electrophoretic dipping composition for cathodic application to an electrically conductive surface which comprises a dipping lacquer containing a catalyst prepared according to claim 1.

7. The composition of claim 6 wherein said dipping lacquer further contains a binder or mixture of binders containing blocked isocyanates.

* * * * *